Patented Dec. 7, 1937

2,101,805

UNITED STATES PATENT OFFICE 2,101,805

PROCESS OF TREATING LEGUMINOUS MATERIALS

Michele Bonotto, Evansville, Ind., assignor to American Soya Products Corporation, Evansville, Ind., a corporation of Indiana No Drawing. Application August 28, 1934, Serial No. 741,822

3 Claims. (Cl. 99—98)

This invention relates to processes of treating leguminous materials to produce a refined protein-rich product, and this application is a continuation-in-part of my pending application Serial No. 437,265 filed March 19, 1930.

My said pending application described and claimed a process of making vegetable product in which colored and/or odoriferous and/or acrid-tasting leguminous material, such as soya beans, are immersed and expanded in a weak and unstable aqueous solution of sulphur dioxide ($SO_2H_2O$) containing said sulphur dioxide in a concentration in excess of the amount necessary to bleach and purify the material but which will be insufficient to change or transform the protein or oil or fat constituents, and then eliminating the excess sulphur dioxide from the material. Heat in a quantity insufficient to coagulate the material is preferably applied in a plurality of operations to liberate the sulphur dioxide from solution and to eliminate the excess from the material, while maintaining the material in an uncoagulated state. The heat may be applied in washing and steaming operations, as for example, by subjecting the material to a bath of pure water at 60° C. to 80° C. and then to a current of steam at 100° C.

I now treat leguminous material, such as soya beans, in a process similar to that described in my said copending application and in accordance with my present invention, I utilize an amount of sulphur dioxide dissolved in water which will have a definite inhibitory effect on bacterial growth in the material and which will at the same time produce enough acidity in the solution to cause the necessary changes to occur with reference to the color, odor and taste of the treated material and also to cause, during the soaking or saturating step of my process hereinafter described, the freeing or extraction of a part of the nitrogen-free-extract content of the material, and this is accomplished without substantial reduction of the protein content and without coagulation of the proteins and/or without oxidation of the oil content.

I have found that the critical limits of the quantities of sulphur dioxide which will produce the results hereinabove specified are between 0.02% which amount will not have a definite inhibitory effect on bacterial growth hereinabove referred to and 0.25% which will cause coagulation of the protein content and oxidation of the oil content of the material and that the optimum quantity which will produce said results is that amount which will produce with water a concentration of 0.06 to 0.07% as sulphur dioxide ($SO_2$) and which gives a pH value of 2.3 to 2.1.

In accordance with my present invention, therefore, I immerse and expand leguminous material, as for example, soya beans, in an aqueous solution of sulphur dioxide between said limits and preferably having the said optimum quantity of sulphur dioxide, and in carrying out my preferred process I take dried soya beans which may be either skinned and cut or break the same in halves or other pieces. Soya beans so cut are in such a condition that oil cells of the beans are in substantially unruptured condition and, in the preferred form of my invention, I immerse a charge of the beans in a solution with said optimum quantity of sulphur dioxide and water ($SO_2H_2O$). This solution, however, preferably contains a quantity of sulphur dioxide in excess of the amount necessary to bleach and purify the charge of beans. I maintain the beans in this solution for a period of time until they are completely soaked or saturated with the solution, which at room temperature, I find happens in about 8 to 12 hours. When so treated, the beans will swell or expand and the solution will be absorbed to such an extent as to thoroughly penetrate the entire structure of the beans. The concentration of the solution and temperature is preferably such as not to change or transform the protein or oil or fat constituents of the soya bean while bleaching the chlorophyl pigment and also completely eliminating the taste produced by the taste producing substances contained in the beans, and particularly removing from the material the acrid-flavor or so-called "beany taste", as well as any odor therein.

While in the preferred form of my present process hereinabove described, I utilize, as the charge of material to be refined, soya beans or leguminous vegetables either whole or in pieces having a maximum number of the oil cells in unruptured condition, it will be obvious that my process may be employed upon material which is broken, sliced, cracked or crushed into any suitable palpable fragmentary particles in any suitable manner, as, for example, by the use of any suitable machinery, including such conventional machines as a slicing machine or a corn degerminator.

After the specified period of time the length of which will, to some extent, depend upon the temperature employed, the solution will have penetrated the beans to such an extent as to enable the chlorophyl pigment of the beans to be changed to a white color and the characteristic taste entirely removed but sulphur dioxide will still remain in the water solution in the beans. This agent is then liberated from the solution in gaseous form. In the case of my said specified agent, ($SO_2H_2O$), this may be accomplished without the use of a neutralizing agent which would leave in the beany material a foreign reaction product or residue.

It is desirable, if not absolutely essential, in a practical process, that a suitable quantity of heat be employed in order to facilitate and accelerate the liberation from the solution of the sulphur dioxide so as to cause this agent to have its bleaching and taste-purifying action on the beany substance and also to expel or to facilitate and accelerate the elimination from the beans of the excess of the sulphur dioxide. For this purpose, the beans so treated may be kept for a time at a certain temperature, and, in the preferred form of my invention, in order to procure the most desirable product in which the protein will be substantially unaltered or unchanged from the natural raw state and the fatty substances will also remain unaltered, I apply the quantity of heat necessary in two operations. Thus, I subject the beans for 8 to 12 minutes to a temperature of about 80° C., and thereafter subject the said beans to a temperature of 100° C. for 30 to 40 seconds.

This quantity of heat may be applied in any desirable manner. For example, the beans may be subjected to a bath of pure water at the aforesaid temperature of approximately 80° C., and the beans may then be subjected to a current of steam (100° C.) for 30 to 40 seconds.

The said liberation, reaction and elimination of the sulphur dioxide may also be accomplished by washing with pure water if the washing is continued for a sufficiently long period of time until all the sulphur dioxide is completely eliminated from the beans and the bath.

Instead of removing the beans from the sulphur dioxide bath and submerging them in another bath of pure water, I may, if desired, empty or drain the tank containing the water solution of sulphur dioxide leaving the beans in this tank and I may then circulate through this tank in any suitable manner pure water preferably of the temperature and for the time hereinabove specified and I may subject the beans in the same container or receptacle to the action of steam at 100° C., for the time hereinabove specified.

The treatment of the soya beans in water at approximately 80° C., for the time specified will not alter, change or substantially reduce the protein content and will not oxidize, alter or change any of the fat or oil constituents of the soya bean, but I find that in this step of my process some of the nitrogen-free-extract of the beany material comprising carbohydrates, celluloses, gums and resins which have become soluble are washed out, so that the resultant product will have a low content of nitrogen-free-extract and a relatively high content of proteins, thus resulting in a highly-desirable protein-rich product, which is bleached and has the acrid or so-called beany or raw taste and any odor removed.

The subjection of the material to steam for the period specified will not have any effect of changing or altering the proteins nor of altering, changing or oxidizing the oil.

After washing and steaming of the beans in the manner hereinabove specified, the skins of the beans, if not theretofore removed, may then be removed, the skinned beans may be ground with water and then filtered or treated centrifugally to procure the extracts of the bean which can be used in its pure form or, if preferred, the extracts may be concentrated or condensed by any conventional method or it may by any suitable conventional method be powdered and utilized for any lawful purpose either in its pure powdered form or with the addition thereto of other ingredients.

Another method of utilizing the refined product of my invention is to dry and grind the refined beans to flour in any conventional manner and then to utilize this refined soya bean flour as the resultant product for any lawful purpose.

It will be understood that when my process hereinabove described is carried out on soya beans or like legumes, I produce a new refined product which will have a white color, because chlorophyl pigment has been completely bleached or extracted; which will have the pleasant and agreeable taste or flavor of the bleached and taste-purified beany substance free from the characteristic unpleasant acrid or raw, beany taste or flavor and free from any foreign salts or other foreign substances such as reaction products of a neutralizing agent with the purifying agent; which will have the proteins in the natural condition unaltered by the process of bleaching and taste-purifying; which will have the proteins and fatty substances in their natural combined form unaltered by the process of removing the pigmented and acrid-tasting substances for the purpose of bleaching and taste-purifying.

In accordance with my invention, the soya-bean products produced are not only freed from acrid or beany tasting substances, but thorough commercial tests and many chemical analyses show that my refined soya-bean products, as compared with soya bean products produced through other processes, contain a much higher percentage of protein and a much lesser percentage of nitrogen-free-extract than products produced by other processes referred to in prior-art literature.

By the term "nitrogen-free-extract" is meant the undetermined constituents of a food or like product obtained by subtracting from 100% the sum of the percentages of the content of moisture, protein, fat, fiber and ash. This term "nitrogen-free-extract" thus includes both carbohydrates and resinous matter.

An average chemical analysis of whole soya bean seed after treatment with my process is as follows:

| Moisture | Protein | Fat | Fiber | N. F. E. | Ash |
|---|---|---|---|---|---|
| 8.41 | 46.92 | 19.57 | 5.10 | 16.90 | 3.10 |

Average analyses of new soya bean seed show from 32.99% to 36.59% protein and from 24.41% to 27.6% of nitrogen-free-extract, with percentages of moisture, fat, fibre and ash making up the balance.

It is desirable also to compare the percentages of protein and nitrogen-free-extract in certain other types or classes of soya-bean products produced by my process with percentages of protein and nitrogen-free-extract in similar products produced by processes referred to in said prior-art literature. For this purpose, the products compared may be divided into three classes, viz. "Class 1, soya-bean flour made from whole beans", "Class 2, soya-bean flours made with oil partially extracted" and "Class 3, soya-bean flour made from beans after oil is substantially all removed with solvent". The average percentages in flour made from my product in said three classes are as follows:

|  | Moisture | Protein | Fat | Fiber | N. F. E. | Ash |
|---|---|---|---|---|---|---|
| Class 1 | 6.10 | 49.63 | 21.3 | 2.93 | 17.14 | 2.9 |
| Class 2 | 7.2 | 60.4 | 9.5 | 3.2 | 16.9 | 2.8 |
| Class 3 | 8.0 | 67.0 | 2.9 | 3.0 | 16.5 | 2.6 |

The average percentages of ingredients of similar prior art soya bean products computed from average percentages shown in several published tables give the following as to the classes above specified:

|  | Moisture or water | Protein | Fat | Fiber | N. F. E. or carbohydrates | Ash |
|---|---|---|---|---|---|---|
| Class 1 | 5.70 | 42.10 | 20.07 | 2.03 | 25.37 | 4.72 |
| Class 2 | 10.26 | 45.86 | 7.09 | 3.71 | 28.94 | 5.86 |
| Class 3 | 10.26 | 49.72 | 2.14 | 4.46 | 26.10 | 5.51 |

Comparing the flour in Class 1 (made from whole beans) it will be seen that the average percentage of nitrogen-free-extract or carbohydrates is 25.37% as against applicant's 17.14% for this particular class.

Referring to Class 2, it will be seen from the charts that the average percentages of nitrogen-free-extract is 28.94% as against applicant's 16.9% for this particular class.

Comparing the percentages in Class 3, shows nitrogen-free-extract or carbohydrates 26.10% as against applicant's 16.5% for this particular class.

In view of this extraction or freeing of the material from a considerable part of nitrogen-free-extract or carbohydrates while substantially all the proteins are retained, I have produced a distinctly different product from the products obtained by prior art processes, and this difference is not merely a difference in degree from such products obtained by prior art processes but of real substance. This extraction of nitrogen-free-extract results as aforesaid in a highly desirable change in the proportions of protein and nitrogen-free-extract in the product and, this difference taken in connection with the freeing of applicant's product from the coloring, odoriferous and acrid tasting substances provides as aforesaid, an entirely new highly-desirable product different from any product heretofore produced, and this novel product results partly from the reaction of the material with an aqueous solution of sulphur dioxide and partly from heat preferably applied through a bath of pure water and the product or article comprises this reaction product freed from certain of the ingredients which are either soluble in said solution or made soluble thereby and/or are driven off by heat or heated water applied in carrying out my said process.

It will be seen that my process, through the extraction or elimination of part of the nitrogen-free-extract content of the original material, as hereinabove specified, concentrates such original material and a concentrated product, characterized by an increased proportion of protein in relation to the other ingredients thereof, is produced.

It will be understood, that instead of employing soya-bean material hereinabove particularly specified, my process may be applied with practical and beneficial results to raw peanuts, and also that other leguminosae having a so-called raw, beany or acrid taste or which embody colored and/or odoriferous substances may be treated and purified thereby.

Having described my invention, I claim:

1. The process of treating leguminous products comprising the subjection of a charge of leguminous material containing bodies possessing an acrid taste and dark-colored substances, to the action of an aqueous solution of sulphur dioxide of a concentration between 0.02% and 0.25% as sulphur dioxide, and then washing said product in pure water.

2. The process of treating leguminous materials comprising the subjection of a charge of legumincus material containing bodies possessing an acrid taste and dark-colored substances, to the action of an aqueous solution of sulphur dioxide of a concentration of 0.06% to 0.07%, having a pH value of 2.3 to 2.1, and then washing said product in pure water.

3. The process of treating leguminous products comprising the subjection of a charge of leguminous material containing bodies possessing an acrid taste and dark-colored substances, to the action of an aqueous solution of sulphur dioxide of a concentration between 0.02% and 0.25% as sulphur dioxide, and eliminating the excess of said sulphur dioxide.

MICHELE BONOTTO.